US009990269B2

(12) United States Patent
Williams

(10) Patent No.: US 9,990,269 B2
(45) Date of Patent: Jun. 5, 2018

(54) APPARATUS AND METHOD FOR CONTROLLING DEBUGGING OF PROGRAM INSTRUCTIONS INCLUDING A TRANSACTION

(71) Applicant: ARM LIMITED, Cambridge (GB)

(72) Inventor: Michael John Williams, Ely (GB)

(73) Assignee: ARM Limited, Cambridge (GB)

( * ) Notice: Subject to any disclaimer, the term of this patent is extended or adjusted under 35 U.S.C. 154(b) by 182 days.

(21) Appl. No.: 15/007,604

(22) Filed: Jan. 27, 2016

(65) Prior Publication Data

US 2016/0239404 A1 Aug. 18, 2016

(30) Foreign Application Priority Data

Feb. 13, 2015 (GB) .................................. 1502423.5

(51) Int. Cl.
*G06F 11/00* (2006.01)
*G06F 11/36* (2006.01)

(52) U.S. Cl.
CPC ...... *G06F 11/3644* (2013.01); *G06F 11/3636* (2013.01)

(58) Field of Classification Search
CPC ......................... G06F 11/3644; G06F 11/3636
See application file for complete search history.

(56) References Cited

U.S. PATENT DOCUMENTS 8,713,371 B2 4/2014 Williams et al.
8,839,038 B2 9/2014 Williams et al.
(Continued)

OTHER PUBLICATIONS

Notice of Allowance dated Sep. 5, 2017 in co-pending U.S. Appl. No. 15/007,578 13 pages.
(Continued)

*Primary Examiner* — Bryce Bonzo
*Assistant Examiner* — Katherine Lin
(74) *Attorney, Agent, or Firm* — Nixon & Vanderhye P.C.

(57) ABSTRACT

An apparatus and method are provided for controlling debugging of program instructions executed on processing circuitry, where the program instructions include a transaction comprising a number of program instructions that execute to generate updates to state data, with the processing circuitry then committing the updates if the transaction completes without a conflict. In addition to the processing circuitry, the apparatus has control storage for storing stepping control data used to control operation of the processing circuitry. The processing circuitry is responsive to the stepping control data having a first value to operate in a single stepping mode, where the processing circuitry initiates a debug event following execution of each instruction. However, if the stepping control data has a second value, the processing circuitry instead is arranged to operate in a step over transaction mode, where the processing circuitry is arranged, when executing the number of program instructions within the transaction, to suppress initiation of the debug event until the transaction has completed. By enabling the processing circuitry to operate in the step over transaction mode, this can avoid probe effects being introduced by debug activity during the execution of the program instructions of a transaction.

19 Claims, 8 Drawing Sheets

(56) References Cited

U.S. PATENT DOCUMENTS

| | | | | |
|---|---|---|---|---|
| 2006/0190769 | A1* | 8/2006 | Doddapaneni | G06F 11/2236 714/38.13 |
| 2006/0294326 | A1 | 12/2006 | Jacobson et al. | |
| 2008/0005193 | A1 | 1/2008 | Lev et al. | |
| 2008/0127035 | A1* | 5/2008 | Lev | G06F 11/362 717/100 |
| 2008/0127113 | A1 | 5/2008 | Wu | |
| 2008/0320334 | A1 | 12/2008 | Taillefer | |
| 2011/0145798 | A1 | 6/2011 | Taillefer et al. | |
| 2011/0302183 | A1 | 12/2011 | Van De Vanter | |
| 2012/0278790 | A1 | 11/2012 | Bates | |
| 2013/0046962 | A1* | 2/2013 | Koesler | G06F 11/267 712/227 |
| 2015/0039945 | A1 | 2/2015 | Moyer | |

OTHER PUBLICATIONS

Search Report for GB1502423.5 dated Aug. 10, 2015, three pages.
U.S. Appl. No. 15/007,578, filed Jan. 27, 2016; Inventor: Williams.
Search Report for GB1502421.9 dated Aug. 10, 2015, 3 pages.

* cited by examiner

APPARATUS AND METHOD FOR CONTROLLING DEBUGGING OF PROGRAM INSTRUCTIONS INCLUDING A TRANSACTION

This application claims priority to GB Patent Application No. 1502423.5 filed 13 Feb. 2015, the entire content of which is hereby incorporated by reference.

BACKGROUND

The present technique relates to an apparatus and method for controlling debugging of program instructions including a transaction.

There may be provided data processing systems supporting transactions in which a number of program instructions execute to generate updates to state data and to commit the updates if the transaction completes without a conflict. Since the updates are only committed if the transaction completes without a conflict, such updates are also referred to herein as speculative updates until such time as they are committed. Such transactions may be used, for example, to facilitate multi-threaded processing using a shared memory in which transactions using data values within the shared memory may be allowed to proceed in parallel relying upon the ability to avoid committing speculative updates should a conflict arise between memory accesses. In most cases, such conflicts do not arise and accordingly the parallel processing proceeds efficiently without the need to support the overhead of more rigid mechanisms, such as the use of memory locks, and yet when a conflict does arise it is possible to recover as the speculative updates to state data will not have been committed.

Performing debugging of such transactions can be problematic, since inspecting the state of the processor executing the transaction whilst the transaction is still in progress can introduce a probe effect that influences the execution of the remainder of the transaction. The probe effect can be significant, and indeed in some situations the debugging activity can cause the transaction to abort, which prevents making progress with the performance of the transaction.

One known debugging mechanism is referred to as single stepping. In accordance with a single stepping mechanism, the processing circuitry is arranged to execute a single instruction and then initiate a debug event following execution of that instruction. This can be repeated for each instruction in turn, and hence enables the debugger to analyse the state of the processor between execution of every instruction. However, whilst such a single stepping mechanism can be very useful, it can be particularly problematic when debugging transactions, since certain probe effects are likely to be introduced that will influence execution of the transaction. Indeed, in some situations the act of single stepping may cause the transaction to abort.

SUMMARY

In one example arrangement, there is provided an apparatus comprising: processing circuitry to execute program instructions including a transaction comprising a number of program instructions that execute to generate updates to state data and to commit said updates if said transaction completes without a conflict; and control storage to store stepping control data used to control operation of the processing circuitry; the processing circuitry being responsive to the stepping control data having a first value to operate in a single stepping mode, where the processing circuitry initiates a debug event following execution of each instruction; the processing circuitry being responsive to the stepping control data having a second value to operate in a step over transaction mode, where the processing circuitry is arranged, when executing the number of program instructions within the transaction, to suppress initiation of the debug event until the transaction has completed.

In a further example arrangement, there is provided a method of operating an apparatus comprising: employing processing circuitry to execute program instructions including a transaction comprising a number of program instructions that execute to generate updates to state data and to commit said updates if said transaction completes without a conflict; storing stepping control data used to control operation of the processing circuitry; responsive to the stepping control data having a first value, operating the processing circuitry in a single stepping mode, where the processing circuitry initiates a debug event following execution of each instruction; and responsive to the stepping control data having a second value, operating the processing circuitry in a step over transaction mode, where the processing circuitry is arranged, when executing the number of program instructions within the transaction, to suppress initiation of the debug event until the transaction has completed.

In an additional example arrangement, there is provided an apparatus comprising: processing means for executing program instructions including a transaction comprising a number of program instructions that execute to generate updates to state data, and for committing said updates if said transaction completes without a conflict; and control means for storing stepping control data used to control operation of the processing means; the processing means, responsive to the stepping control data having a first value, for operating in a single stepping mode, where the processing means initiates a debug event following execution of each instruction; the processing means, responsive to the stepping control data having a second value, for operating in a step over transaction mode, where the processing means, when executing the number of program instructions within the transaction, suppresses initiation of the debug event until the transaction has completed.

In a yet further example arrangement, there is provided a debug control method, comprising: employing processing circuitry to execute program instructions including a transaction comprising a number of program instructions that execute to generate updates to state data and to commit said updates if said transaction completes without a conflict; causing said processing circuitry to execute an instruction from said program instructions, to store syndrome information in a data storage location at least if the instruction is a first instruction of the transaction, and to initiate a debug event; responsive to said debug event, performing within a debugger the following steps: determining from said syndrome information whether said instruction is the first instruction of said transaction; and on determining that said instruction is the first instruction of said transaction, analysing the transaction to determine at least one exit point from said transaction, issuing breakpoint information for said at least one exit point as control data for said processing circuitry, and triggering the processing circuitry to resume execution of said program instructions starting with said first instruction of said transaction.

A further example arrangement provides a debugger apparatus for debugging processing circuitry used to execute program instructions including a transaction comprising a number of program instructions that execute to generate updates to state data and to commit said updates if said transaction completes without a conflict, the debugger apparatus comprising: syndrome analysis circuitry, responsive to a debug event initiated by said processing circuitry on executing an instruction from said program instructions and storing in a data storage location syndrome information at least if the instruction is a first instruction of the transaction, to determine from said syndrome information whether said instruction is the first instruction of said transaction; and breakpoint determination circuitry, responsive to the syndrome analysis circuitry determining that said instruction is the first instruction of said transaction, to analyse the transaction to determine at least one exit point from said transaction, to issue breakpoint information for said at least one exit point as control data for said processing circuitry, and to trigger the processing circuitry to resume execution of said program instructions starting with said first instruction of said transaction.

A yet further example arrangement provides an apparatus to be analysed by a debugger, comprising: processing circuitry to execute program instructions including a transaction comprising a number of program instructions that execute to generate updates to state data and to commit said updates if said transaction completes without a conflict; and control storage to store control data used to control operation of the processing circuitry; the processing circuitry being responsive to the control data identifying a single stepping mode, to execute an instruction from said program instructions, to store syndrome information in a data storage location at least if the instruction is a first instruction of the transaction, and to initiate a debug event.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
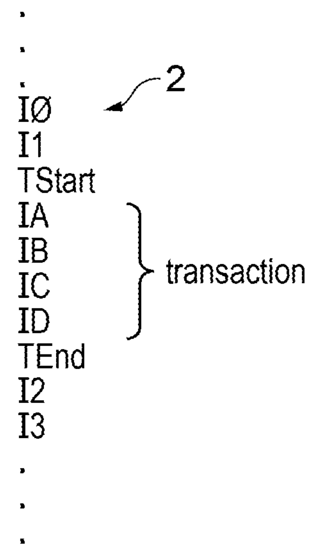
FIG. 1 schematically illustrates a stream of program instructions including a transaction.

Before discussing the embodiments with reference to the accompanying figures, the following description of embodiments is provided.

Within processing systems which support transactions, such as systems incorporating transactional memory, a number of program instructions execute to generate speculative updates to state data (e.g. architectural state data) and operate to permit (commit) those speculative updates if the transaction concerned completes without a conflict. As an example, a transaction may include load or store operations to memory locations and if those load and store operations complete without an access from outside the transaction attempting to make a conflicting (or potentially conflicting) access to the same memory locations, then the results of those transactions are committed and update the architectural system state. If there is a conflict, then the transaction aborts and saved previous state data is used to "roll back" the state of the system to a point before the transaction was executed. The transaction may then be repeated sometime later to see if it completes without a conflict arising, may give rise to an exception, may be executed in a different way (e.g. using a lock mechanism) or otherwise processed depending upon the particular form of the system concerned.

Other types of conflicts that can cause a transaction to abort include exhaustion of resources for managing a transaction (e.g. temporary storage, depth counter for nested transactions, etc.) or an exception, such as a data abort (MMU fault), interrupt, etc. interrupting the transaction.

In one embodiment, an apparatus has processing circuitry for executing program instructions that include a transaction. The transaction comprises a number (i.e. one or more) of program instructions that execute to generate speculative updates to state data, with the processing circuitry committing the speculative updates if the transaction completes without a conflict. The apparatus also has control storage for storing stepping control data used to control operation of the processing circuitry, and in particular to control how stepping functionality is implemented when seeking to debug the program instructions being executed by the processing circuitry. The processing circuitry is responsive to the stepping control data having a first value to operate in a single stepping mode, where the processing circuitry initiates a debug event following execution of each instruction. Hence, if the stepping control data has the first value, a traditional single stepping mechanism is implemented. However, if the stepping control data has a second value, the processing, circuitry is arranged to operate in a step over transaction mode. In particular, when executing the number of program instructions within the transaction in the step over transaction mode, the processing circuitry will suppress initiation of the debug event until the transaction has completed. By suppressing the debug event until the transaction has completed, this enables forward progress to be made in respect of the transaction, and avoids any probe effect being introduced during the execution of the transaction, including avoiding the potential for the transaction to be terminated due to handing of the debug event.

There are a number of ways in which the transaction may complete. Assuming the transaction completes normally, this may for example arise due to a transaction end instruction being executed to signify the end of the transaction. However, it is also possible that the transaction may abort part way through the transaction, that is complete without finishing, due to a conflict being detected. In both the normal execution case and the transaction abort case, the transaction will be deemed to have completed when the transaction finishes or the abort takes place, and at that point the pending debug event will be initiated.

In one embodiment, when the stepping control data has the second value, the processing circuitry is arranged, when executing an instruction not in said transaction, to initiate the debug event following execution of that instruction. Hence, in such embodiments, the fact that the stepping control data has the second value does not affect the way in which instructions not in the transaction are handled, and instead single stepping is still performed in respect of instructions that are not in the transaction.

There are a number of ways in which the processing circuitry can suppress initiation of the debug event when executing program instructions within the transaction whilst in the step over transaction mode. In one embodiment, the processing circuitry is arranged to set as pending the debug event when a first instruction in said transaction is executed, and to initiate that debug event when the transaction has completed. Hence, the required information for the debug event is captured, but stored as a pending debug event rather than the debug event being initiated at that time. Instead, only when the transaction has completed is a true debug event initiated based on the stored pending debug event.

The stepping control data can take a variety of forms, but in one embodiment comprises stepping enable data and configuration data, when the stepping enable data has a value indicating that stepping is enabled, the configuration data indicating whether said stepping control data has the first value or the second value. The provision of the configuration data provides a simple mechanism for determining whether the processing circuitry should operate in the single stepping mode or in the step over transaction mode when the stepping enable data indicates that stepping is enabled.

The configuration data can take a variety of forms, but in one embodiment comprises a configuration bit which is set to indicate that the stepping control data has the second value, and is cleared to indicate that the stepping control data has the first value. It will be appreciated that the value used to indicate the set state or the clear state will vary dependent on implementation, and hence whilst in one embodiment a logic one value may indicate the set state and a logic zero value may indicate the clear state, in an alternative embodiment a logic zero value may indicate the set state and a logic one value may indicate the clear state.

In one embodiment, the control storage comprises a plurality of control registers, at least one control register in said plurality being used to store the stepping control data. In one example embodiment, as an alternative to employing the earlier mentioned configuration data, one or more of the control registers can be used to enable the first value or the second value to be specified, or for a third value to be specified indicating that stepping is not enabled. In one embodiment, all three of these values may be specifiable within a single register, whilst in an alternative embodiment, separate registers may be used, one to store the first value or the third value, and one to store the second value or the third value. Storing the third value in the first register will hence indicate that the single stepping mode is disabled, whilst storing the third value in the second register will indicate that the step over transaction mode is disabled.

In one embodiment, the apparatus further comprises transaction tracking circuitry to track whether the processing circuitry is executing an instruction within the transaction or an instruction outside the transaction, the processing circuitry referencing the transaction tracking circuitry when operating in the step over transaction mode. This provides an efficient mechanism for enabling the processing circuitry to determine whether it needs to suppress initiation of the debug event or not, dependent on whether the instruction being executed is within the transaction, or outside the transaction.

In one embodiment, the program instructions executed by the processing circuitry include a plurality of nested transactions, the processing circuitry being arranged, when in said step over transaction mode, to suppress initiation of the debug event until the plurality of nested transactions have completed. Hence, in such an arrangement, only when all of the plurality of nested transactions have completed will the debug event be initiated.

In one such embodiment, the transaction tracking circuitry maintains at least one counter to track progress through the plurality of nested transactions, so as to enable the processing circuitry to determine when the plurality of nested transactions have completed, and hence when the debug event is to be initiated. The counter may for example be incremented each time a new transaction within the plurality of nested transactions is started, and decremented each time one of those nested transactions ends, hence enabling the processing circuitry to know when all of the nested transactions have ended, and accordingly the debug event should be initiated.

In an alternative embodiment, a debug control method is provided for processing circuitry that executes program instructions including a transaction. The debug control method involves causing the processing circuitry to execute a single instruction from the program instructions, to store syndrome information in a data storage location at least if the single instruction is a first instruction of the transaction, and to initiate a debug event. A debugger is then responsive to the debug event to determine from the syndrome information whether the single instruction that has been executed is the first instruction of the transaction. On determining that the single instruction is the first instruction of the transaction, the debugger analyses the transaction in order to determine at least one exit point from the transaction, and issues breakpoint information for that at least one exit point as control data for the processing circuitry. Thereafter the processing circuitry is triggered to resume execution of the program instructions starting from the first instruction of the transaction.

Hence, in accordance with such an embodiment, single stepping is performed, but once the first instruction of the transaction is encountered, and the debug event initiated, the debugger detects from the syndrome information that the first instruction of the transaction has been encountered, and rather than allowing the processing circuitry to return to single stepping it instead sets one or more breakpoints associated with the exit point(s) of the transaction. Then when the processing circuitry resumes executing instructions again starting with the first instruction of the transaction, it will no longer perform single stepping, but once a breakpoint is encountered, indicating that an exit point of the transaction has been reached, this will cause a breakpoint debug event to be initiated. As a result, it will be appreciated that such an approach provides an alternative mechanism for stepping over the transaction, hence avoiding the introduction of probe effects during the execution of a transaction due to debugging activity.

In one embodiment, if the debugger determines from the syndrome information that the single instruction that has been executed is not a first instruction of the transaction, then the debugger performs a debug operation required by the debug event.

Thereafter, in one embodiment, after performing the debug operation, the debugger triggers the processing circuitry to execute a next single instruction from the program instructions. Hence, it can be seen that in the absence of the syndrome information indicating that the first instruction of the transaction has been encountered, the processor continues to perform single stepping.

The syndrome information can take a variety of forms. It could for example take the form of a type identifier indicating the type of instruction executed and hence flagging when a transaction start instruction has been encountered. In one embodiment, syndrome information may be captured for every instruction that is executed during single stepping operation, whilst in an alternative embodiment the syndrome information may only be stored specifically when the single instruction executed is the first instruction of a transaction. In such an arrangement, the debugger can determine from the presence or absence of the syndrome information whether the first instruction of the transaction has been executed.

In one example, the syndrome information may in fact comprise a single syndrome bit which is cleared when the executed instruction is not the first instruction of a transaction, and is set when the single instruction executed is the first instruction of a transaction. In an alternative embodiment, the syndrome information may be a multi-bit field, used to identify whether the instruction is the first instruction of a transaction, is not the first instruction of a transaction, or it is not known whether it is or is not the first instruction of a transaction. In the latter case, the debugger will be responsive to the syndrome information indicating "not known" to analyse the instruction itself to determine whether the instruction is or is not the first instruction of a transaction.

In one embodiment, the debug control method further comprises operating the processing circuitry in a single step mode of operation when executing said single instruction, and on determining that said single instruction is a first instruction of said transaction, causing the single step mode to be exited before the processing circuitry resumes execution of said program instructions starting with said first instruction of said transaction.

In one embodiment, the debug control method further comprises storing control data within control storage accessible to the processing circuitry, the control data indicating whether a single step mode is set to cause the processing circuitry to execute said single instruction, and further including said breakpoint information issued by the debugger. Hence, in the above example embodiment, the control data will initially have the single step mode indicated as being set causing single stepping to be performed. However, on encountering the first instruction of the transaction, the debugger will analyse the transaction in order to determine appropriate breakpoint information, will set that breakpoint information within the control registers, and will then disable single step mode. Once the processing circuitry then resumes execution starting with the first instruction of the transaction, it will then execute the program instructions of the transaction until a breakpoint match is detected, at which point the next debug event will be initiated.

As discussed earlier, a transaction may complete either due to executing a final instruction of the transaction, or due to the transaction being aborted, for example due to a conflict. In one embodiment, an exit point is detected for each of these possible transaction completion mechanisms, and corresponding breakpoint information set accordingly.

In one embodiment, each exit point has an associated program counter value, and the breakpoint information comprises an indication of that associated program counter value.

There are a number of ways in which the debugger may trigger the processing circuitry to resume execution of the program instructions starting with the first instruction. In one embodiment, this is achieved by rewinding a program counter value used to identify a next instruction to be executed by the processing circuitry so that the program counter value identifies as the next instruction the first instruction of said transaction, and then triggering the processing circuitry to resume execution of said program instructions.

Particular embodiments will now be described with reference to the Figures.

FIG. 1 schematically illustrates a stream of program instructions 2 which may be executed by processing circuitry. It will be appreciated that this stream of program instructions may be one executing thread within a multi-threaded system. Alternatively, the stream of program instructions may be the only thread of program instructions executing. Within the stream of program instructions illustrated in FIG. 1, there are included a transaction start instruction TStart and a transaction end instruction TEnd. These instructions respectively indicate the boundaries of a transaction comprising instructions IA, IB, IC and ID. These instruction delimited by the TStart and the Tend are executed by the processing circuitry to generate speculative updates to state data. These speculative updates are stored within memory or cache, or within other storage resources of the system (e.g. shadow registers, special purpose memory permitting roll back, and the like) until it is determined that the transaction has completed without a conflict at which point the speculative updates are committed to the system update the architectural state of the system with the stored roll back data then being discarded freeing up the associated memory resource to support a further transaction).

Figure 2A:
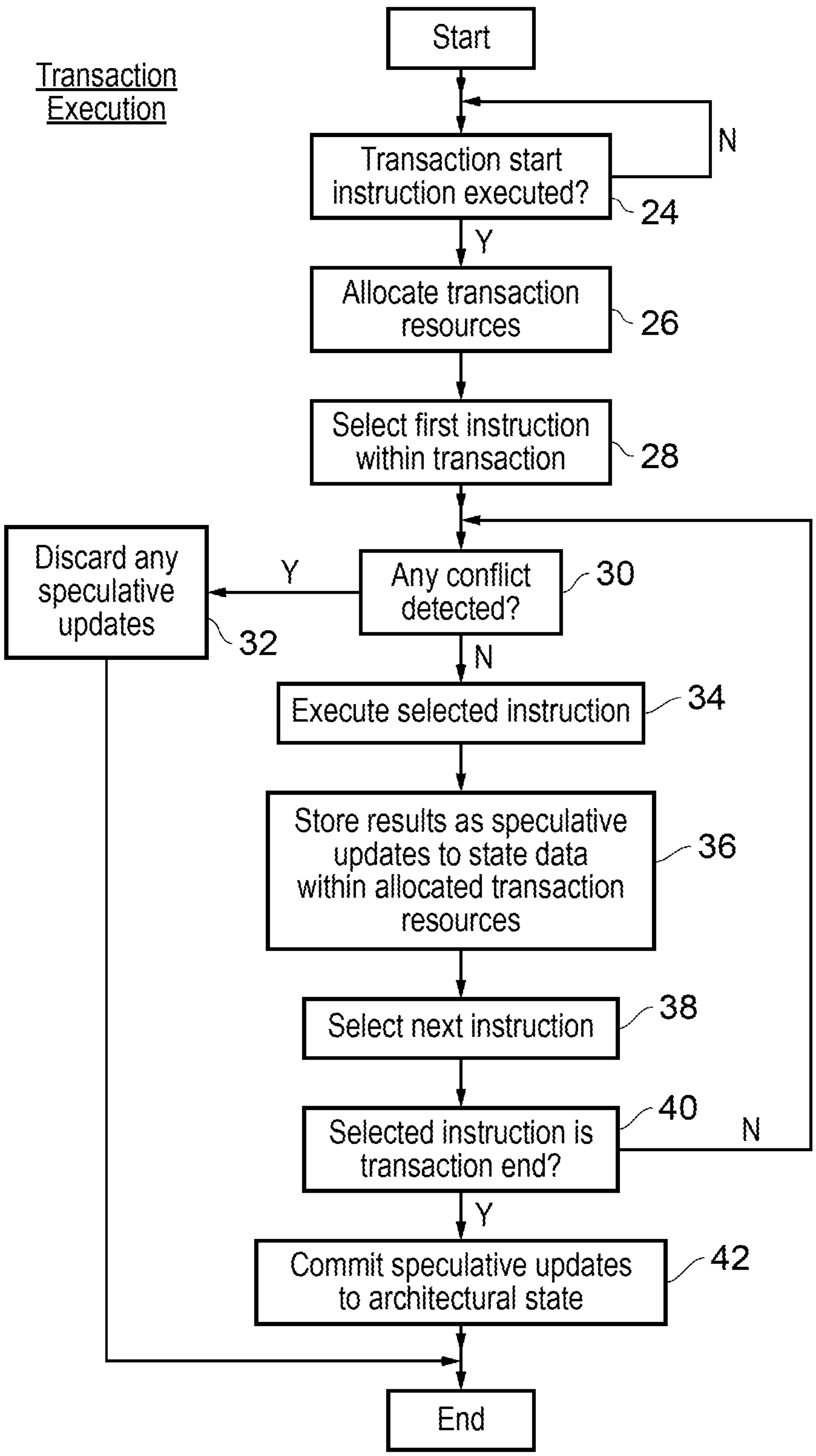
FIGS. 2A and 2B are flow diagrams schematically illustrating transaction execution.

FIG. 2A is a flow diagram schematically illustrating the execution of a transaction comprising multiple program instructions. At step 24 processing waits until a transaction start instruction (TStart) is executed. Step 26 then allocates transaction resources to be used, for example, resources to store the speculative updates to state data prior to the transaction completing. Step 28 selects the first instruction within the transaction. Step 30 determines whether or not there are any conflicts detected at that time. If there are any such conflicts detected, then step 32 serves to discard any speculative updates jump to a fix-up routine (or otherwise indicate to the software that the transaction has failed) and return the transaction resources allocated at step 26 for use in other transactions.

If there are no conflicts detected at step 30, then step 34 serves to execute the selected instruction. Step 36 then stores the results of the execution at step 34 as speculative updates to state data within the allocated transaction resources. Step 38 selects a next instruction. Step 40 determines whether or not the selected instruction is a transaction end instruction (TEnd). If the instruction is not a transaction end instruction, then processing returns to step 30. If the determination at step 40 is that the selected instruction is a transaction end instruction, then step 42 serves to commit the speculative updates stored within the allocated transaction resources so as to update the architectural state of the system.

Figure 2B:
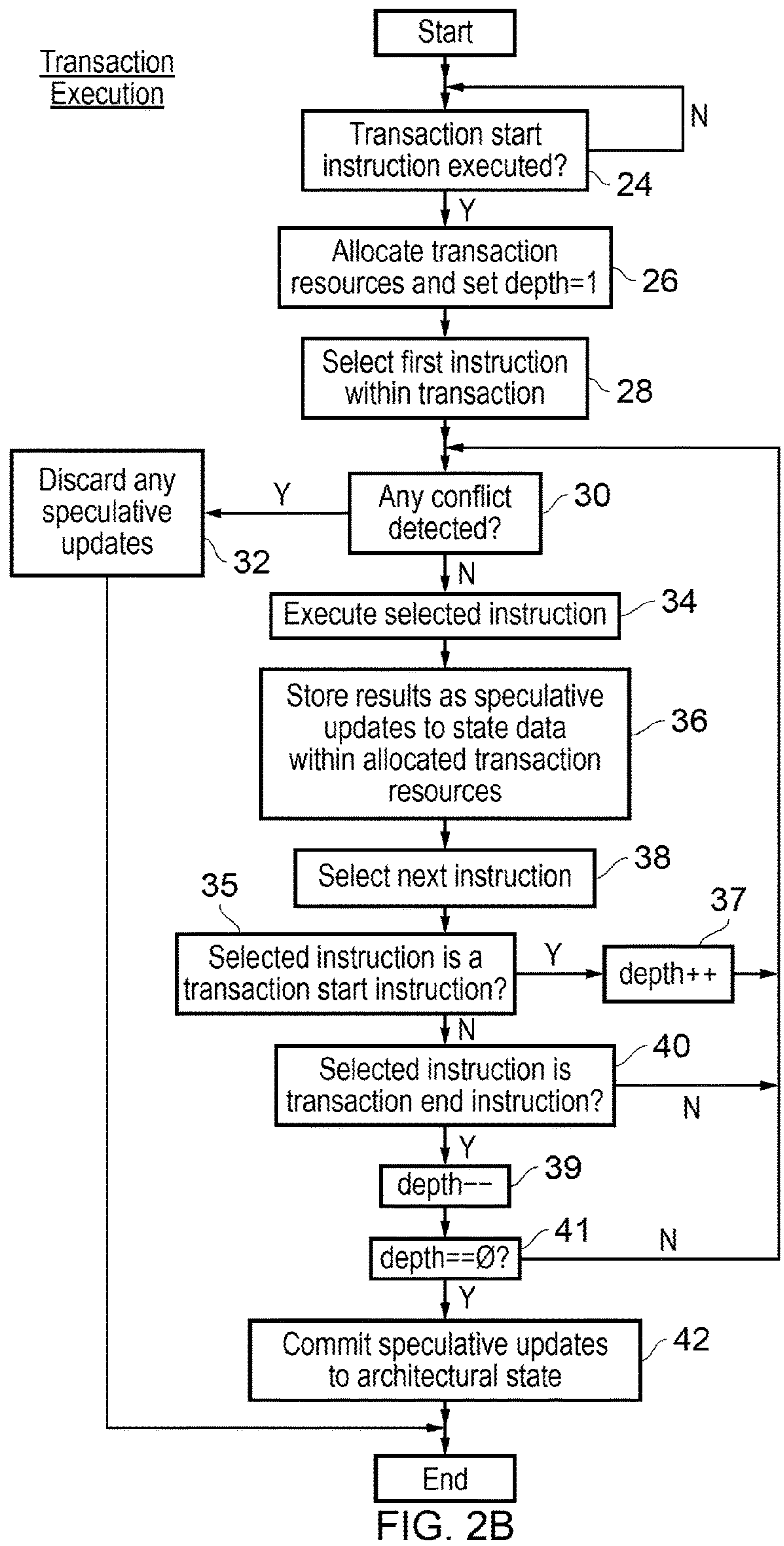

FIG. 2B is a flow diagram schematically illustrating the transaction execution of FIG. 2A modified to support flat transaction nesting. At step 26 a transaction nest depth counter is set to "1" when the transaction resources are allocated. After the next instruction is selected at step 38, step 35 determines if the selected instruction is a transaction start instruction. If the selected instruction is a transaction start instruction, then step 37 serves to increment the depth counter and processing returns to step 30.

If the determination at step 35 is that the selected instruction is not a transaction start instruction, then step 40 determines if the selected instruction is a transaction end instruction. If the selected instruction is not a transaction end instruction, then processing returns to step 30. If the selected instruction is a transaction end instruction, then step 39 decrements the depth counter and step 41 determines if the depth counter has a value equal to zero. If the depth counter does not equal zero, then processing again returns to step 30. If the depth counter does equal zero, then processing proceeds to step 42 as in FIG. 2A.

The action of FIG. 2B is to track the flat nested transaction depth and to commit the speculative updates stored in the allocated transaction resources, in response to the transaction started at step 24, when that same transaction is ended. In one embodiment, an abort serves to abort all nested transactions. It is also possible that other example embodiments may support the nesting of transactions.

Figure 3A:
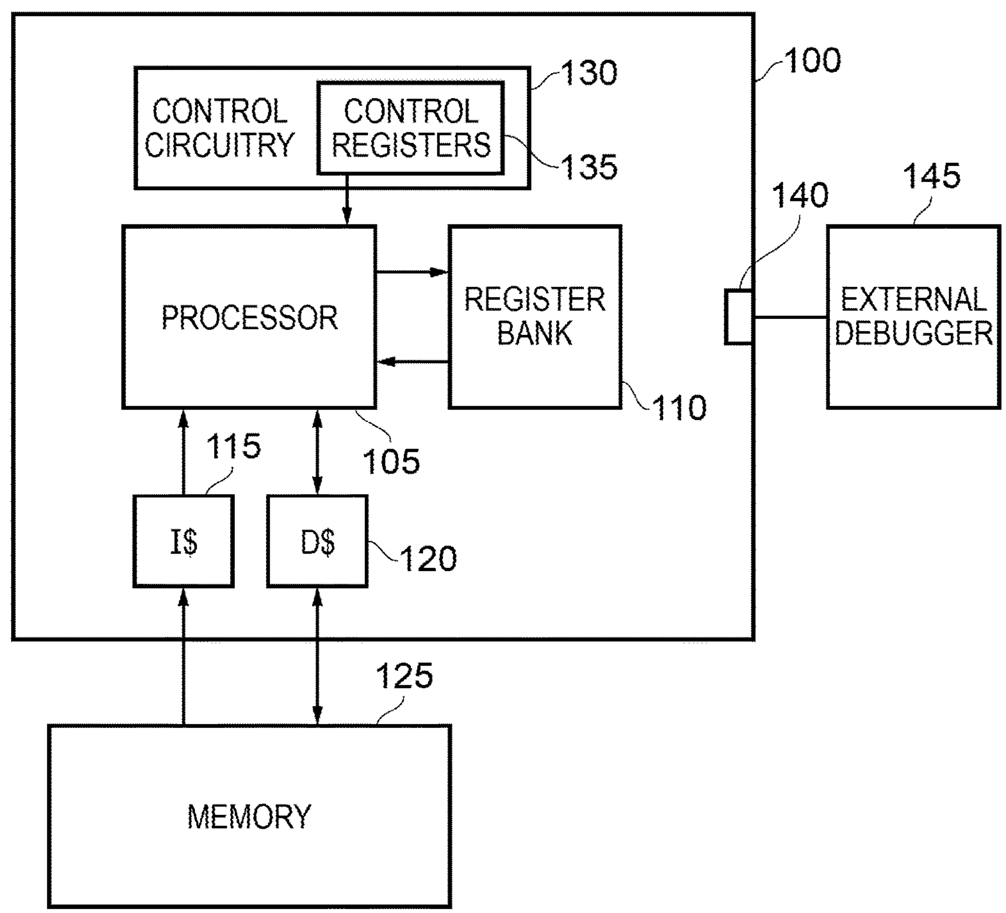
FIG. 3A illustrates an apparatus in accordance with one embodiment.

FIG. 3A is a block diagram illustrating an apparatus 100 in accordance with one embodiment, that may be used to execute program instructions including one or more transactions. The program instructions will be stored in memory 125, and typically retrieved via one or more levels of instruction cache 115 for forwarding to the processor 105 for execution. During execution, the processor has access to a register bank 110 used to store values used by the processor during executing the instructions. The processor will also load data values from the data cache 120 and store data values to the data cache 120, the data cache potentially involving multiple levels of cache, and being coupled to the memory 125. Typically load instructions will be used to load data values from the data cache 120 into the register bank 110, and store instructions will be used to store data values from the register bank 110 back to the data cache 120.

Control circuitry 130 is also provided for controlling the operation of the processor, the control circuitry including one or more control registers 135 whose contents are referenced by the processor to control the operations performed by the processor. Some of the control registers may be debug control registers that an external debugger 145 can access via a debug port 140 on the apparatus 100 in order to control certain debugging activity of the program instructions being executed by the processor. The debug port 140 can also be used by the external debugger 145 to retrieve certain system state information maintained within the apparatus during execution of the instructions, for analysis during debugging activities.

Figure 3B:
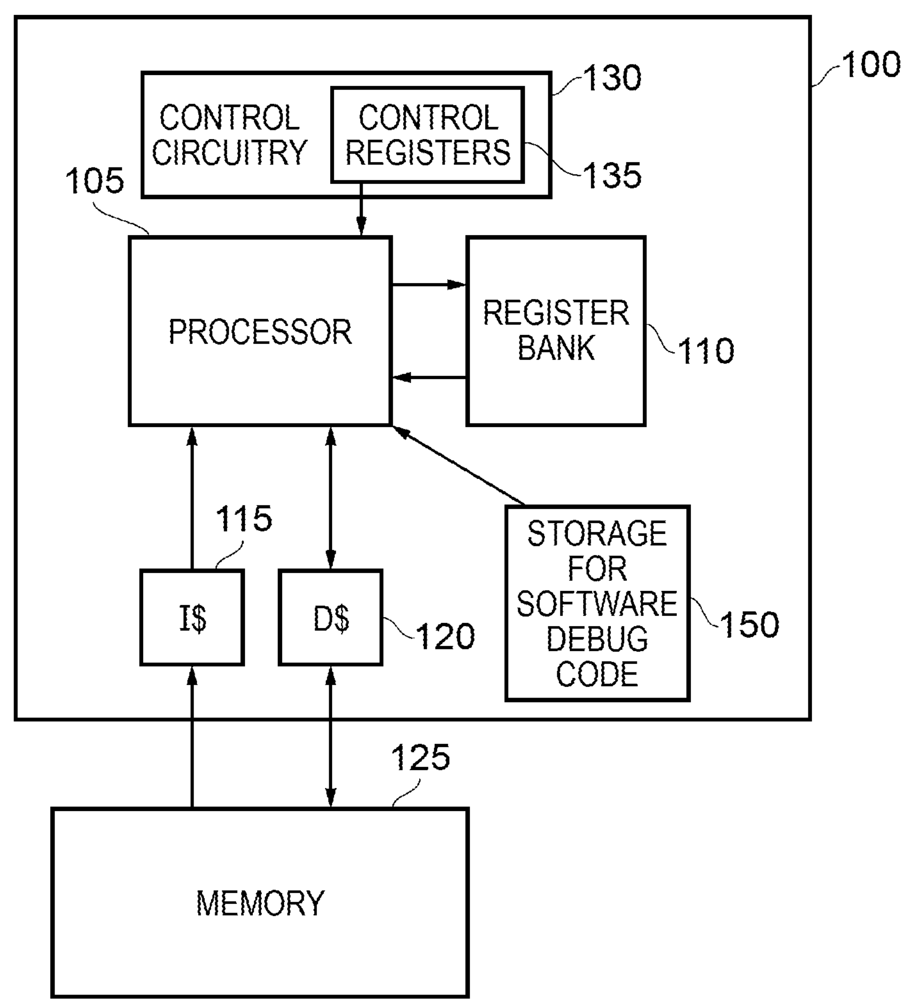
FIG. 3B illustrates an apparatus in accordance with an alternative embodiment.

Whilst in FIG. 3A the debugger is an external debugger 145, for example a computer running suitable debugging software, in an alternative embodiment the debugger may be implemented by software debug code stored within the apparatus 100, for example within the storage 150 shown in the embodiment of FIG. 3B. Debug exceptions can be issued by the processor during execution (at which point debug is typically disabled) to cause the software debug code to be run on the processor to perform certain debug operations, whereafter an exception return can then be used in order to branch back to execution by the processor of the program instructions from the instruction cache 115, with debug then being re-enabled at that point.

As mentioned earlier, one type of debugging activity that is often performed is single stepping, where the processor is arranged to execute a single instruction, and then to initiate a debug event in order to allow the debugger to analyse the state of the apparatus 100 after that single instruction has been executed. The debugger can then cause the process to execute the next single instruction, whereafter the debug event is again initiated to pass control back to the debugger. This process can be continued for each of the program instructions executed by the processor. However, as mentioned earlier, this can cause probe effect problems to be introduced when handling transactions.

In the embodiments described herein, a number of mechanisms are provided for enabling the processor to step over a transaction so that debug events are not initiated whilst the processor is executing the program instructions of the transaction.

Figure 4A:
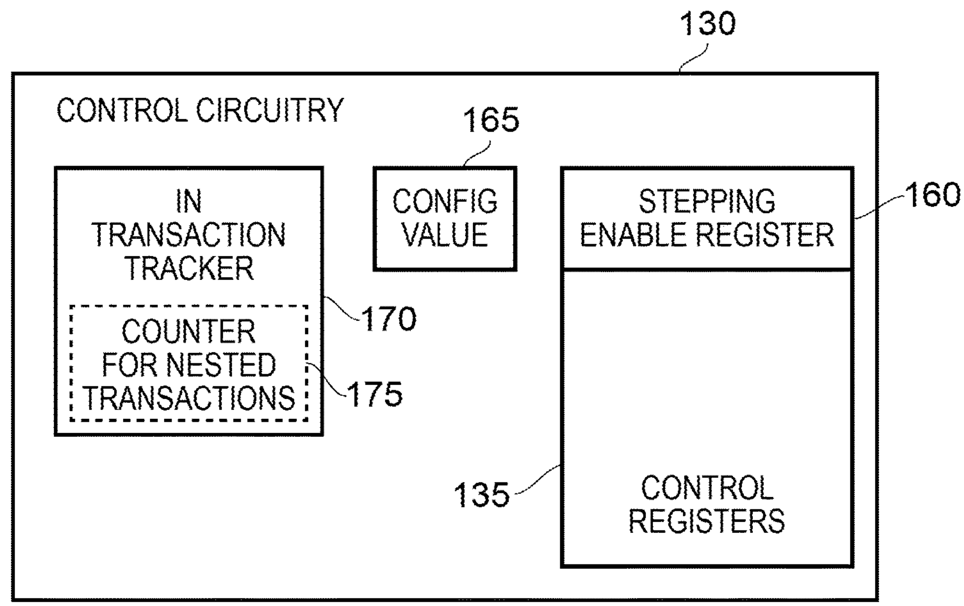
FIGS. 4A and 4B illustrate the control circuitry of FIGS. 3A and 3B in accordance with two alternative embodiments.

In one embodiment, the control circuitry 130 of FIG. 3A or 3B can take the form shown in FIG. 4A. One of the control registers 135 is a stepping enable register 160 used to enable or disable stepping. However, in addition a configuration value is stored in a configuration register 165 and is used to determine whether single stepping is required when the stepping enable register indicates that stepping is enabled, or whether a step over transaction functionality is required. In particular, if the stepping enable register 160 indicates that stepping is enabled, and the configuration value has one value, the processing circuitry will operate in a single stepping mode, where the processing circuitry initiates a debug event following execution of each instruction. However, if the configuration value has another value, and the stepping enable register indicates that stepping is enabled, then this causes the processing circuitry to operate in a step over transaction mode, where the processing circuitry is arranged, when executing the number of program instructions within the transaction, to suppress initiation of the debug event until the transaction has completed. The configuration value can in one embodiment be a single bit value, which is set to indicate the step over transaction mode and cleared to indicate the single stepping mode.

In one embodiment, when the processing circuitry is executing instructions that are not in the transaction, it will for those instructions perform single stepping whenever the stepping enable register indicates that stepping is enabled, irrespective of the value stored in the configuration register 165.

In one embodiment, the control circuitry may also include an in transaction tracker 170 for determining whether a current program instruction being executed by the processor 105 is within a transaction or not. In the earlier discussed example of nested transactions, it may also include a suitable mechanism for keeping track of the level of nesting in order to determine whether the program instruction being executed is still within a transaction or not. In one particular embodiment, this mechanism can take the form of counter circuitry 175 which can maintain the depth information referred to in the earlier discussed FIG. 2B in order to determine whether the processor is still executing instructions within a transaction or not.

Figure 4B:
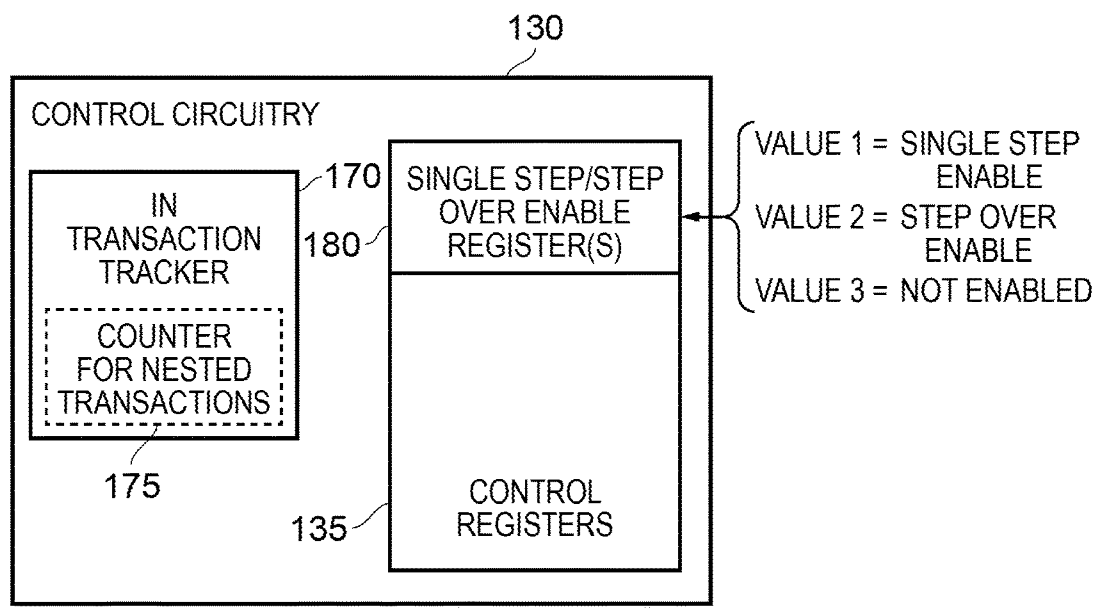

FIG. 4B illustrates an alternative arrangement of control circuitry where the configuration register 165 is not used, and instead one or more registers 180 within the set of control registers 135 is used to encode whether the single stepping mode is enabled, the step over transaction mode is enabled, or stepping is not enabled. Three separate values can be specified for these three separate states, and may in one embodiment be stored within a single register. Alternatively, there may be a separate register for enabling or disabling the single stepping mode, and a further separate register for enabling or disabling the step over transaction mode.

Figure 5:
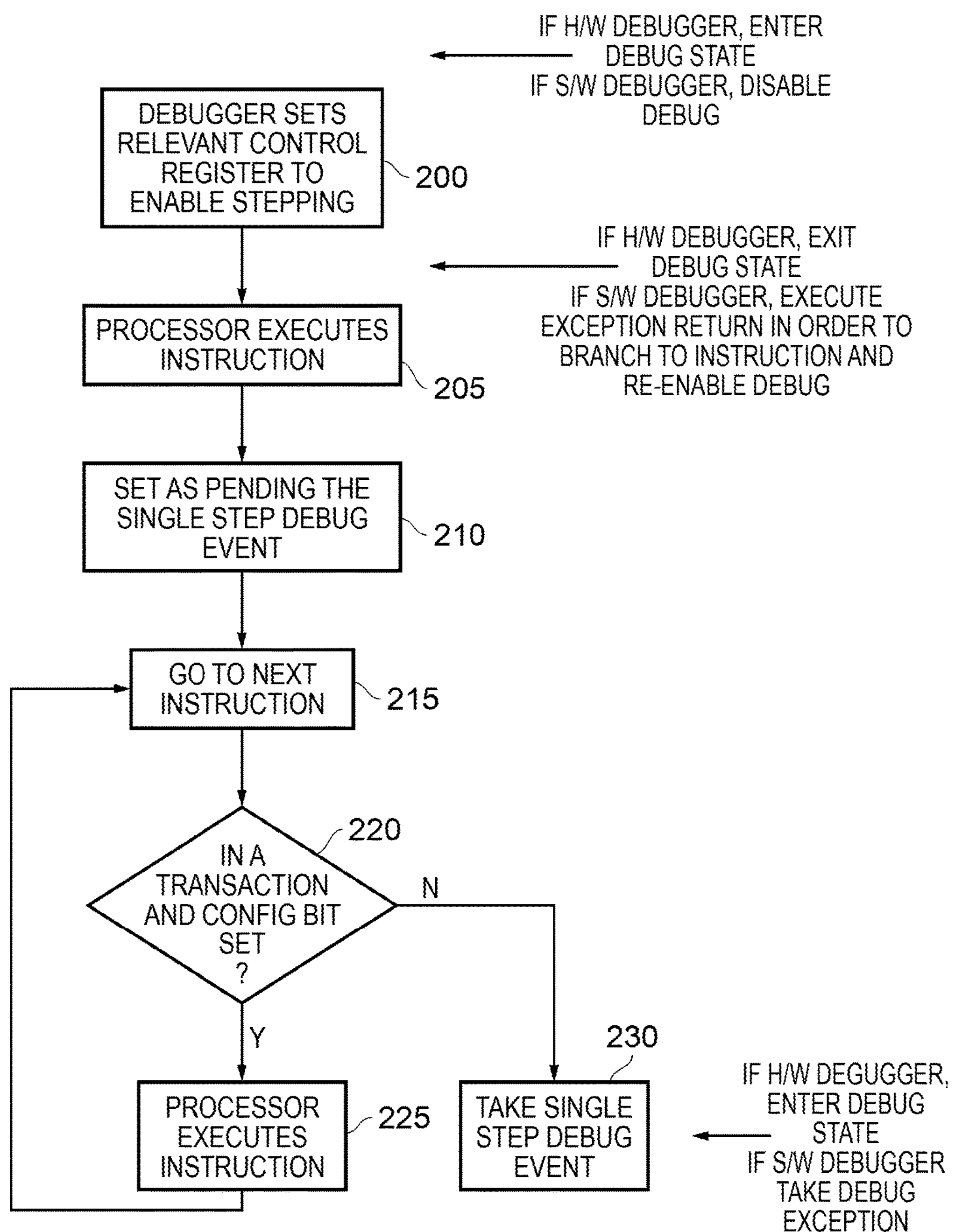
FIG. 5 is a flow diagram illustrating how single step behaviour is modified for transactions in accordance with one embodiment.

FIG. 5 is a flow diagram illustrating the operation of the apparatus shown in FIG. 3A or 3B in accordance with one embodiment. If the hardware debugger arrangement of FIG. 3A is used, then prior to step 200 the processor will enter the debug state. If the software debugger approach of FIG. 3B is instead used, then prior to step 200 debug will be disabled. At step 200, the debugger then sets the relevant control register within the set of control registers 135 in order to enable stepping. Following step 200, then if the hardware debugger approach is adopted, the debug state will be exited, whilst if the software debugger approach is adopted, then an exception return will be executed in order to branch to the next instruction in the program sequence being executed by the processor and to re-enable debug.

At step 205, the processor will then execute the next instruction, i.e. the instruction pointed to by the program counter value, and thereafter at step 210 will set as pending the single step debug event given that stepping functionality has been enabled. The program counter value will then be updated at step 215 to point to the next instruction, whereafter at step 220 it will be determined whether the instruction now pointed to is within a transaction and the step over transaction mode has been enabled. In the particular example shown in FIG. 5, it is assumed that the control circuitry 130 of FIG. 4A is used, in which event it can be determined whether the step over transaction mode has been enabled by reference to whether the configuration bit has been set. The information provided by the in transaction tracker 170 will determine whether the processor is within a transaction or not.

If the processor is not within a transaction, then single stepping is required irrespective of whether the processing circuitry is in single stepping mode or step over transaction mode, and accordingly the process will branch to step 230 where a single step debug event will be taken. Similarly, if the configuration bit is not set, then this will indicate that the processor is in the single stepping mode, and accordingly irrespective of whether the processor is within a transaction or not the process will branch to step 230 where a single step debug event will be taken. If the hardware debugger approach of FIG. 3A is being used, this will involve placing the processor in the debug state. If the software debugger approach of FIG. 3B is used, then step 230 will involve taking a debug exception to pass control over to the software debug code which will then be run on the processor to perform the required debugging activities.

However, if at step 220 it is determined that the processor is within a transaction and the configuration bit is set, this indicates that initiation of the debug event should be suppressed, and accordingly the process does not branch to step 230, but instead proceeds to step 225 where the processor executes the next instruction, whereafter the process returns to step 215.

As mentioned earlier, step 220 in FIG. 5 assumes that the control circuitry takes the form shown in FIG. 4A. However, if the control circuitry instead takes the form shown in FIG. 4B, it will be appreciated that at step 220 it will be determined whether the processor is still within the transaction with reference to the in transaction tracker 170, and will be determined whether the step over transaction mode has been enabled with reference to the contents of the register(s) 180.

In the above described embodiments, the processor is placed in either a single stepping mode or a step over transaction mode dependent on stepping control data. In an alternative embodiment that will be described with reference to FIG. 6, the processor is only ever placed in a single stepping mode or has single stepping disabled, and there is no separate step over transaction mode. The control circuitry may hence in such an embodiment utilise a single stepping enable register 160, and no configuration register 165 is needed. However, through appropriate interventions taken by the debugger, it is still possible to implement the required step over transaction functionality.

Figure 6:
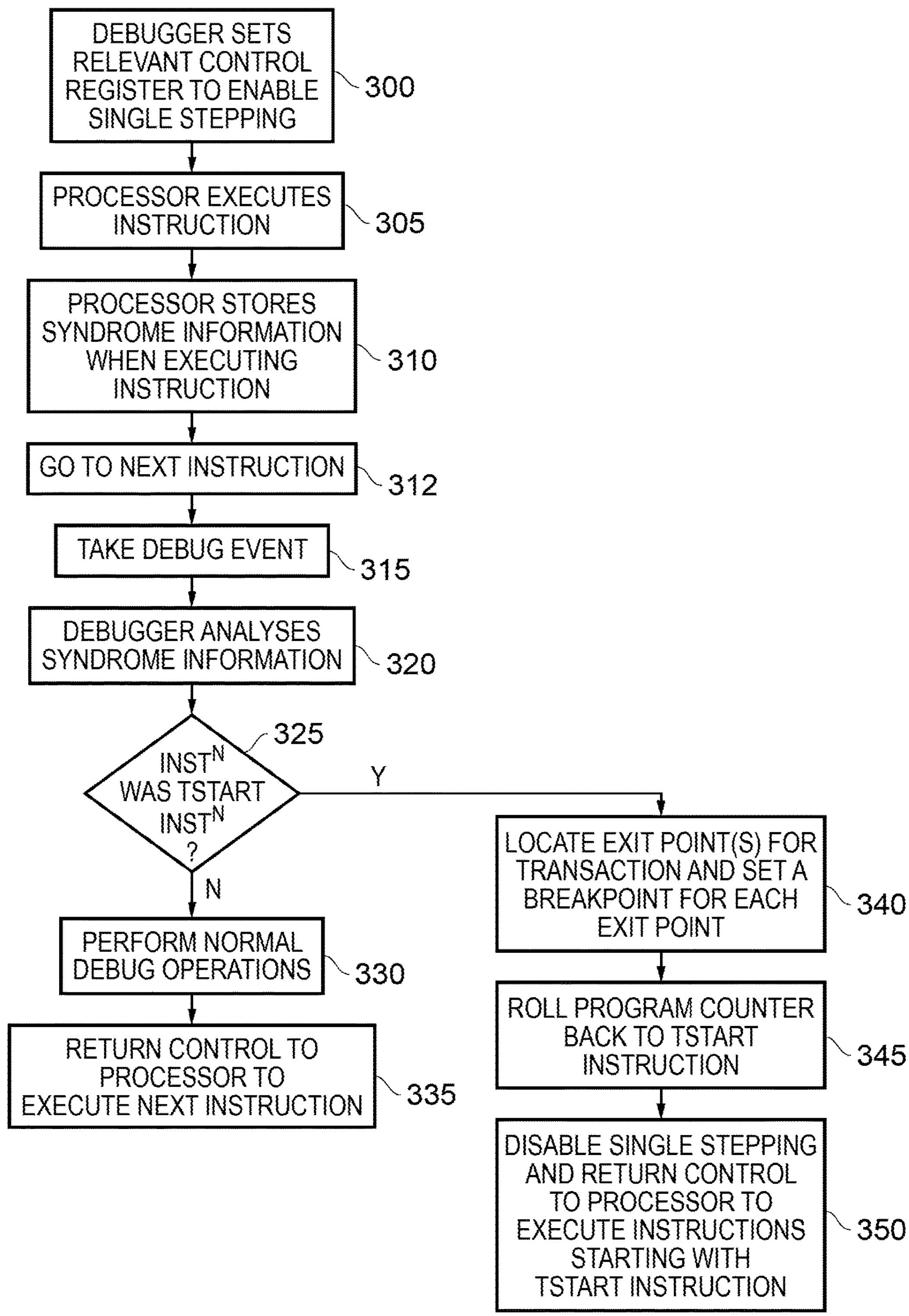
FIG. 6 is a flow diagram illustrating how single step behaviour is modified for transactions in accordance with an alternative embodiment.

In particular, FIG. 6 is a flow diagram describing the required sequence of steps in order to achieve such functionality. Steps 300, 305, 312 and 315 correspond with the steps 200, 205, 215 and 230 of FIG. 5, but at step 300 it will always be single stepping that is enabled as there will be no separate step over transaction mode.

At step 310, the processor stores syndrome information when executing the instruction, or at least when executing the first instruction of a transaction. This syndrome information is stored as state data within the apparatus, and may for example be stored within a control register accessible to the debugger. The syndrome information can take a variety of forms, and may for example be a type indicator indicating the type of instruction executed at step 305. Hence, in such an embodiment, the syndrome information will capture if the instruction executed is a TStart instruction. If desired, syndrome information can also be stored for any other of the instructions executing, but in an alternative embodiment, for the purposes of the functionality required in FIG. 6, it will be sufficient if syndrome information is only stored when the instruction executed at step 305 is a TStart instruction. As an alternative to a type indicator, the syndrome information may in fact in one embodiment be a single bit, which is set if the instruction executed at step 305 is a TStart instruction, and which is otherwise cleared.

At step 312 the program counter will then be updated to point to the next instruction and at step 315 a debug event is taken to significant that a single step execution has taken place. This hands over control to the debugger, which at step 320 analyses the syndrome information, and then at step 325 determines whether the instruction executed at step 305 was a TStart instruction.

If not, then the debugger will typically perform any debug operations normally required in response to a single step debug event at step 330, and then will return control to the processor at step 335 to cause the processor to execute the next instruction.

However, if it is determined at step 325 that the instruction was a TStart instruction, the processing instead proceeds to step 340, where the debugger analyses the program instructions of the transaction in order to locate the exit point(s) for the transaction and to then set a breakpoint for each exit point. In particular, there will be one or more exit point(s) corresponding to transaction end instruction(s), but may also be one or more exit points corresponding to transaction abort detection. Each exit point will have a corresponding program counter value, and in one embodiment a breakpoint is set for each exit point by setting the respective program counter values within breakpoint registers provided within the control registers 135.

At step 345, the debugger then rolls the program counter back to the TStart instruction, and then at step 350 disables single stepping by clearing the relevant register 160 within the control registers. At this point, it returns control to the processor, causing the processing to execute instructions starting from the TStart instruction. Since single stepping is no longer enabled, the processor will execute the program instructions of the transaction until an exit point is reached. On reaching that exit point, a breakpoint match will be detected with reference to the contents of the breakpoint registers, and this will cause a breakpoint debug event to be taken, at that point passing control back to the debugger. By such an approach, it can be seen that the required functionality of stepping over the transaction has been achieved, and accordingly the program instructions of the transaction can be executed without introducing any probe effect due to debugging.

Whilst steps 340 and 345 can potentially take a relatively long period of time and hence have an effect on processing performance, it will be appreciated that the debugger only needs to perform such steps when a TStart instruction is encountered, and accordingly the approach in FIG. 6 can be very useful in situations where it is desired not to introduce the different modes of operation of the processor required when adopting the earlier described approach of providing a single stepping mode and a separate step over transaction mode.

In an alternative embodiment, the processor may be arranged to operate in a manner such that steps 312 and 345 are not required. In particular, the processor may be arranged, on detecting a single step condition on a TStart instruction, to store syndrome information and immediately generate a debug event without going to the next instruction (hence omitting step 312). This removes the need to perform the rollback step 345, which may be advantageous to the debugger. If desired, a configuration value could be provided to allow this feature to be enabled and disabled as required.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

processing circuitry to execute program instructions including a transaction comprising a number of program instructions that execute to generate updates to state data and to commit said updates if said transaction completes without a conflict; and control storage to store stepping control data used to control operation of the processing circuitry;

the processing circuitry being responsive to the stepping control data having a first value to operate in a single stepping mode, where the processing circuitry initiates a debug event following execution of each instruction;

the processing circuitry being responsive to the stepping control data having a second value to operate in a step over transaction mode, where the processing circuitry is arranged, when executing the number of program instructions within the transaction, to suppress initiation of the debug event until the transaction has completed.

2. An apparatus as claimed in claim 1, wherein when the stepping control data has said second value, the processing circuitry is arranged, when executing an instruction not in said transaction, to initiate the debug event following execution of that instruction.

3. An apparatus as claimed in claim 1, wherein when the stepping control data has said second value, the processing circuitry is arranged to set as pending the debug event when a first instruction in said transaction is executed, and to initiate that debug event when the transaction has completed.

4. An apparatus as claimed in claim 1, wherein the stepping control data comprises stepping enable data and configuration data, when the stepping enable data has a value indicating that stepping is enabled, the configuration data indicating whether said stepping control data has said first value or said second value.

5. An apparatus as claimed in claim 4, wherein said configuration data comprises a configuration bit which is set to indicate that the stepping enable data has said second value, and is cleared to indicate that the stepping enable data has said first value.

6. An apparatus as claimed in claim 1, wherein the control storage comprises a plurality of control registers, at least one control register in said plurality being used to store the stepping control data.

7. An apparatus as claimed in claim 6, wherein said at least one control register is settable to one of said first value, said second value, and a third value indicating that stepping is not enabled.

8. An apparatus as claimed in claim 1, further comprising:

transaction tracking circuitry to track whether the processing circuitry is executing an instruction within said transaction or an instruction outside said transaction, the processing circuitry referencing said transaction tracking circuitry when operating in said step over transaction mode.

9. An apparatus as claimed in claim 1, wherein the program instructions executed by the processing circuitry include a plurality of nested transactions, the processing circuitry being arranged, when in said step over transaction mode, to suppress initiation of the debug event until the plurality of nested transactions have completed.

10. An apparatus as claimed in claim 9, further comprising:

transaction tracking circuitry to track whether the processing circuitry is executing an instruction within said transaction or an instruction outside said transaction, the processing circuitry referencing said transaction tracking circuitry when operating in said step over transaction mode;

wherein the transaction tracking circuitry maintains at least one counter to track progress through the plurality of nested transactions, so as to enable the processing circuitry to determine when the plurality of nested transactions have completed, and hence when the debug event is to be initiated.

11. A method of operating an apparatus comprising:

employing processing circuitry to execute program instructions including a transaction comprising a number of program instructions that execute to generate updates to state data and to commit said updates if said transaction completes without a conflict;

storing stepping control data used to control operation of the processing circuitry;

responsive to the stepping control data having a first value, operating the processing circuitry in a single stepping mode, where the processing circuitry initiates a debug event following execution of each instruction; and responsive to the stepping control data having a second value, operating the processing circuitry in a step over transaction mode, where the processing circuitry is arranged, when executing the number of program instructions within the transaction, to suppress initiation of the debug event until the transaction has completed.

12. A debug control method, comprising:

employing processing circuitry to execute program instructions including a transaction comprising a number of program instructions that execute to generate updates to state data and to commit said updates if said transaction completes without a conflict;

operating said processing circuitry in a single step mode of operation to execute an instruction from said program instructions, to store syndrome information in a data storage location at least if the instruction is a first instruction of the transaction, and to initiate a debug event;

responsive to said debug event, performing within a debugger the following steps:

determining from said syndrome information whether said instruction is the first instruction of said transaction; and on determining that said instruction is the first instruction of said transaction, analysing the transaction to determine at least one exit point from said transaction, issuing breakpoint information for said at least one exit point as control data for said processing circuitry, and triggering the processing circuitry to exit the single step mode of operation and then resume execution of said program instructions starting with said first instruction of said transaction.

13. A debug control method as claimed in claim 12, further comprising:

on determining that said instruction is not a first instruction of said transaction, performing using said debugger a debug operation required by the debug event.

14. A debug control method as claimed in claim 12, further comprising:

storing control data within control storage accessible to the processing circuitry, the control data indicating whether a single step mode is set to cause the processing circuitry to execute said instruction, and further including said breakpoint information issued by the debugger.

15. A debug control method as claimed in claim 12, wherein:

each exit point has an associated program counter value, and the breakpoint information comprises an indication of that associated program counter value.

16. A debug control method as claimed in claim 12, wherein the debugger triggers the processing circuitry to resume execution of said program instructions starting with said first instruction of said transaction by:

rewinding a program counter value used to identify a next instruction to be executed by the processing circuitry so that the program counter value identifies as said next instruction the first instruction of said transaction, and then triggering the processing circuitry to resume execution of said program instructions.

17. A debugger apparatus for debugging processing circuitry used to execute program instructions including a transaction comprising a number of program instructions that execute to generate updates to state data and to commit said updates if said transaction completes without a conflict, the debugger apparatus comprising:

syndrome analysis circuitry, responsive to a debug event initiated by said processing circuitry on executing in a single step mode of operation an instruction from said program instructions and storing in a data storage location syndrome information at least if the instruction is a first instruction of the transaction, to determine from said syndrome information whether said instruction is the first instruction of said transaction; and breakpoint determination circuitry, responsive to the syndrome analysis circuitry determining that said instruction is the first instruction of said transaction, to analyse the transaction to determine at least one exit point from said transaction, to issue breakpoint information for said at least one exit point as control data for said processing circuitry, and to trigger the processing circuitry to exit the single step mode of operation and then resume execution of said program instructions starting with said first instruction of said transaction.

18. An apparatus to be analysed by a debugger, comprising:

processing circuitry to execute program instructions including a transaction comprising a number of program instructions that execute to generate updates to state data and to commit said updates if said transaction completes without a conflict; and control storage to store control data used to control operation of the processing circuitry;

the processing circuitry being responsive to the control data identifying a single stepping mode, to execute an instruction from said program instructions, to store syndrome information in a data storage location at least if the instruction is a first instruction of the transaction, and to initiate a debug event.

19. An apparatus as claimed in claim 18, wherein the processing circuitry is subsequently responsive to a debugger providing breakpoint information identifying at least one exit point from said transaction and disabling the single stepping mode, to begin executing said program instructions starting with said first instruction of said transaction, such that a breakpoint is triggered when said at least one exit point is encountered during execution of said program instructions.

* * * * *